Nov. 4, 1969 AKIRA KISHIMOTO 3,475,980
ROPEWAY WITH VARIABLE SPEED GEAR MECHANISM
Filed May 8, 1968 2 Sheets-Sheet 1
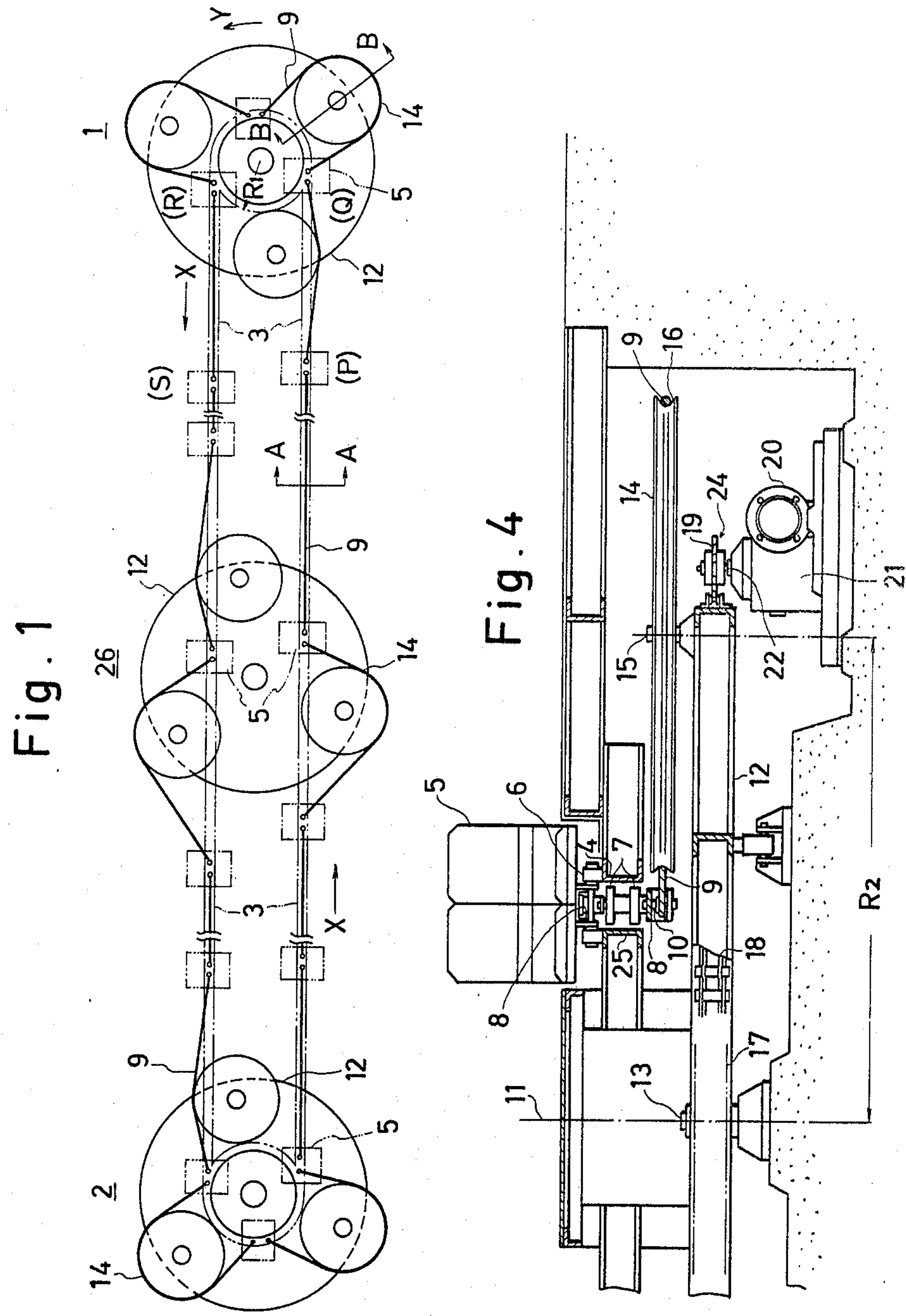
INVENTOR
AKIRA KISHIMOTO
BY Kurt Kelman
AGENT INVENTOR.
AKIRA KISHIMOTO
BY Kurt Kelman
AGENT

United States Patent Office 3,475,980
Patented Nov. 4, 1969

3,475,980

ROPEWAY WITH VARIABLE SPEED GEAR MECHANISM

Akira Kishimoto, Toyonaka-shi, Japan, assignor to Fuji Transport Industry Co., Ltd., Osaka-fu, Japan, a corporation of Japan Filed May 8, 1968, Ser. No. 727,432
Claims priority, application Japan, May 22, 1967, 42/32,768
Int. Cl. F16h 27/02, 19/06
U.S. Cl. 74—89.22 2 Claims

ABSTRACT OF THE DISCLOSURE

A ropeway with a variable speed gear mechanism in which one of a plurality of ropes is stretched between a pair of a plurality of carriages which ride and move on an endless track through being pulled by the rope and a pair of turn-tables with a plurality of rotating wheels at the peripheral parts of the turn-tables are provided where the direction of moving of the carriages is converted, said ropes being also stretched over the rotating wheels which rotate around their own axes and revolve around the axes of the turn-tables.

BACKGROUND OF THE INVENTION

This invention relates to a ropeway having a varible speed gear mechanism and more particularly to a ropeway in which a plurality of carriages are arranged equidistantly on an endless track and move on the rail of the track or hanging down from the track. The moving velocity of the cariages is reduced to a low speed at a portion where the direction of moving of the carriages is converted, said portion serving as a getting-in and getting-out station to the carriage, to facilitate getting-in and getting-out quite easy and at a portion other than the portion stated above the moving velocity of the carriage is increased to obtain a high transportation efficiency and that the variable speed gear mechanism is accomplished by the driving mechanism for the ropeway.

SUMMARY OF THE INVENTION

In the ropeway of subject invention, a plurality of carriages arranged equidistantly move on the rail of a track or hanging down from the track, the ends of a rope which is stretched between a pair of neighbouring carriages are bound to each of the carriages rockably around a pivot axis, a pair of turn-tables are provided at places where the direction of moving the carriages is converted, said turn-tables being rotatable around the axis of the direction converting portion, a plurality of rotating wheels are provided on each of the turn-tables freely rotatably and equidistantly in the periphery of the turn-table at places where the centers of the rotating wheels are outside of the radius of the loop of the track, the height of the rotating wheels being the same level as that of the ropes, and means for driving the turn-table is provided. As the rotating wheels revolve around the axes of the turn-tables each of the ropes is wound on the periphery of a rotating wheel and is fed to the direction of moving of the carriages. According to the provision that the centers of the rotating wheels are positioned outside of the radius of the track, the velocity of winding the rope onto the rotating wheels is reduced relative to the revolving velocity of the rotating wheel which is the moving velocity of the carriages so that the moving velocity of the carriage is reduced at the direction converting portion than the moving velocity of the carriages at any other portion excluding the direction converting portion.

Therefore, an object of subject invention is to provide a ropeway which is simple in construction and low in cost for manufacturing.

Another object of subject invention is to provide a ropeway in which the mechanism for driving the ropeway serves as the mechanism for varying the speed of the ropeway.

Further object of subject invention is to provide a ropeway in which the moving velocity of the carriages is reduced at the direction converting portion than any other portion.

BRIEF DESCRIPTION OF THE DRAWINGS

FIG. 1 is a skeleton diagram showing the plan of the whole ropeway of subject invention, FIG. 4 is an enlarged sectional view of the ropeway taken along lines B—B in FIG. 1.

DESCRIPTION OF THE PREFERRED EMBODIMENTS

Figure 3:
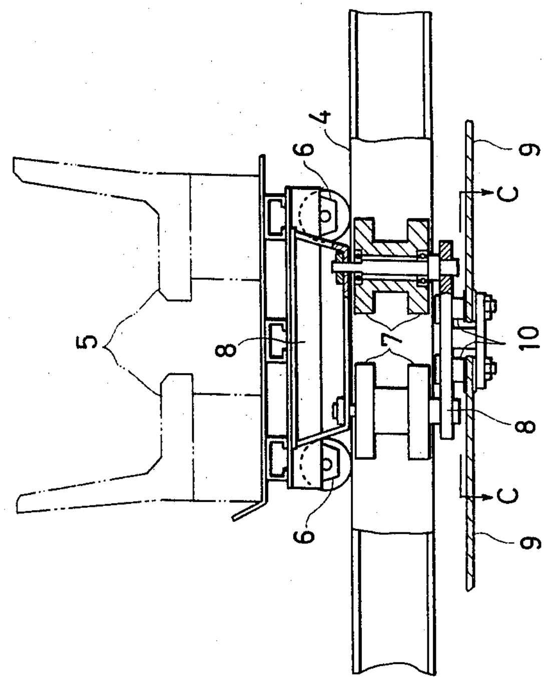
FIG. 3 is a partially sectioned side elevation of a part of the ropeway shown in FIG. 2.
Figure 5:
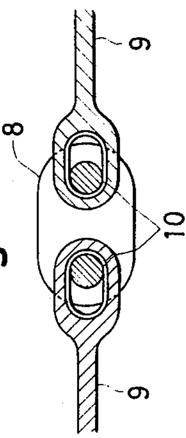
FIG. 5 is a sectional view of the rope and the pivot axis taken along lines C—C in FIG. 3.
Figure 2:
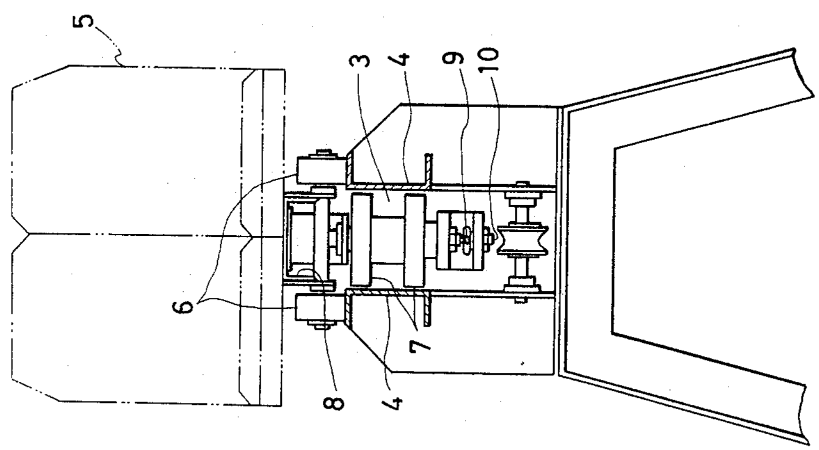
FIG. 2 is an enlarged sectional view of the ropeway taken along lines A—A in FIG. 1.

In the five drawings, a track 3 has a pair of direction converting portions 1 and 2 and is constructed by means of a pair of rails 4 and 4 facing each other and having a section of a channel type. A plurality of carriages 5 are equidistantly mounted on the track and are freely movable along the track by means of a plurality of rollers 6 and 7 which roll on and between the rails, respectively, said rollers being rotatably fixed to a frame 8. Each of ropes 9 is stretched between a frame 8 of one of the carriages and a frame 8 of the succeeding one of the carriages through each pivot axis 10 of the one carriage and the succeeding carriage. A pair of turn-tables 12 are provided on each one of rotating axes 13 free rotatably around centers 11 of direction converting portions 1 and 2. A plurality of rotating wheels 14 are provided on each of turn-tables 12 free rotatably and equidistantly in the periphery of the turn-table at places where the center of the rotating wheels are outside of the radius $R_1$ of the loop of track 3 making the distance $R_2$ between the center of the rotating wheels and the center of the turn-table larger than the radius $R_1$ of the loop of the track and making the height of the rotating wheels the same as that of ropes 9 which fit in a groove 16 provided on each of the rotating wheels. A chain 18 is fixed along a peripheral surface 17 of one of turn-tables 12 so as to mesh with a chain wheel 19 which is connected to a shaft 22 of a reduction gear mechanism 21 driven by an electrical motor 20.

At portion 26, a turn-table 12 may be provided to facilitate to make the portion a getting-in and getting-out station when track 3 is made extremely long, in accordance with the durability of rope 9 against the tensile force of the rope. It may be desirable to drive positively the turn-table which locates at portion 26.

The operation of the ropeway of subject invention is explained precisely hereinafter.

When electrical motor 20 is energized shaft 22 of reduction gear mechanism 21 rotates with chain wheel 19 to drive chain 18. One of turn-tables 12 rotates around center 11 so that rotating wheels 14 revolve around center 11 as shown by an arrow Y. Revolution of rotating wheels 14 causes rope 9 wound around wheel 14 in groove 16 in the area of track 3 of direction converting portions 1 and 2 and stretched and driven linearly in the area of track 3 between direction converting portions 1 and 2. In the area of track 3 between direction converting portions 1 and 2, rope 9 is driven at a velocity the same as that rotating wheels 14 revolve and accordingly carriages 5 advance at the same velocity as shown by an arrow X. In the area of track 3 of direction converting portions 1 and 2, the velocity of rope 9 is reduced by the amount that rope 9 is wound around wheel 14 from the original amount that is the same as the revolution of wheel 14 so that the velocity of carriages 5 is reduced while the carriages are in the area in the direction converting portions. More particularly, the velocity of the carriages is reduced on the track from point P to point Q, the carriages move at the reduced low speed from point Q to point R, the velocity of the carriages is increased on the track from point R to point S and, thereafter, the carriages move at the increased high or normal speed. For example, the carriages move at a low speed such as 15 m./min. from point Q to point R to facilitate getting-in and getting-out quite easy and the carriages move at a normal speed such as 50 m./min. from point S and on to obtain a high transportation efficiency.

At a getting-in and getting-out station 26 which is provided midway the track, the velocity of the carriages can be made reduced in the manner similar to that stated as to direction converting portions 1 and 2.

As stated above, the gist of subject invention is in that the velocity of the carriages is substantially reduced at the getting-in and getting-out station where the direction of the track is converted so that in this area the carriages move normally at low speed and the velocity of the carriages is increased to the original valve at the part other than the getting-in and getting-out station to increase the transportation efficiency. In subject invention, changing the velocity of the carriages and driving the carriages are effected only by one mechanism in which the rotating wheels rotate and revolve and, therefore, it is not necessary to provide a velocity changing mechanism and a carriage driving mechanism, separately, to obtain an ideal and efficient transportation. As a result of the mechanism, the ropeway of subject invention has a simple construction and can be easily and advantageously manufactured.

In the embodiment explained hereinbefore, a ropeway in which the carriages are mounted on the rail of the track is referred to. However, the mechanism applied to the embodiment can also be applied to a ropeway in which the carriages are hung down from the rail of the track and also a chain can be utilized in place of the rope in the mechanism of the embodiment.

In FIG. 1, the embodiment is shown as having three of the rotating wheels. However, when the elements such as, the number of rotating wheels 14, the diameter of rotating wheels 14, the distance between the center of rotating wheels 14 and the center of turn-table 12, the radius of turn-table 12, the shape of track 13 and the distance between pivot axes 10 are selected properly and when means for positioning carriages 5 between a pair of neighboring rotating wheels 14 are provided, pulsation of the velocity of the carriages between portion 1 and portion 2 and relaxation of rope 9 accompanied by variation in the total length of the rope caused by moving the rotating position of the rotating wheels can be eliminated so that the ropeway is operated smoothly under a normal condition under tension.

What is claimed is:

1. A ropeway having a variable speed gear mechanism with a plurality of carriages arranged equidistantly on an endless track and moving on the rail of the track or hanging down from the track, comprising:

a plurality of ropes having the ends thereof stretched between a pair of neighboring carriages and bound to each of said carriages rockably around a pivot axis, a pair of turn-tables provided at places where the direction of moving of the carriages is converted, said turn-tables being rotatable around the axis of the direction converting portion, a plurality of rotating wheels provided on each of the turn-tables free rotatably and equidistantly in the periphery of the turn-table, the height of said rotating wheels being the same as that of the ropes, and means for driving the turn-table.

2. A ropeway having a variable speed gear mechanism specified in claim 1, in which the rotating wheels are provided at places where the centers of the rotating wheels are outside of the radius of the loop of the track.

References Cited

FOREIGN PATENTS

| | | |
|---|---|---|
| 493,062 | 4/1954 | Italy. |
| 1,062,715 | 12/1953 | France. |
| 1,356,766 | 2/1964 | France. |

FRED C. MATTERN, Jr., Primary Examiner

W. S. RATLIFF, Jr., Assistant Examiner

U.S. Cl. X.R.

74—37